United States Patent
Nakamura et al.

(10) Patent No.: US 8,081,442 B2
(45) Date of Patent: Dec. 20, 2011

(54) REMOVABLE DATA-STORAGE DEVICE

(75) Inventors: Gentaro Nakamura, Kanagawa (JP);
Hirokazu Tanizawa, Tokyo (JP);
Tadaaki Tomikawa, Kanagawa (JP);
Tetsuo Yuki, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/475,437

(22) Filed: May 29, 2009

(65) Prior Publication Data
US 2011/0069444 A1 Mar. 24, 2011

(30) Foreign Application Priority Data
May 29, 2008 (JP) ................................. 2008-141760

(51) Int. Cl.
*G06F 1/16* (2006.01)
*H05K 5/00* (2006.01)
*H05K 7/00* (2006.01)
(52) U.S. Cl. .............................. 361/679.36; 361/679.33
(58) Field of Classification Search . 361/679.33–679.37
See application file for complete search history.

(56) References Cited

U.S. PATENT DOCUMENTS

| | | | | |
|---|---|---|---|---|
| 6,324,054 B1 * | 11/2001 | Chee et al. | ............... | 361/679.34 |
| 6,487,039 B1 * | 11/2002 | Bernett | ....................... | 360/97.02 |
| 6,661,604 B2 * | 12/2003 | Hashizume et al. | ........ | 360/97.02 |
| 6,798,656 B1 * | 9/2004 | Lin | ............................... | 361/690 |
| 7,242,552 B2 | 7/2007 | Kudo et al. | | |
| 7,420,784 B2 * | 9/2008 | Sekimoto et al. | ............. | 360/266 |
| 2004/0032711 A1 * | 2/2004 | Kaczeus et al. | ............... | 361/685 |
| 2004/0100761 A1 * | 5/2004 | Liu | ............................... | 361/685 |
| 2005/0141141 A1 * | 6/2005 | Sekimoto et al. | .......... | 360/266.3 |
| 2006/0181845 A1 * | 8/2006 | Shah et al. | ..................... | 361/685 |
| 2006/0285287 A1 * | 12/2006 | Chen et al. | ..................... | 361/685 |
| 2007/0285885 A1 * | 12/2007 | Lin | ............................... | 361/684 |
| 2008/0037211 A1 * | 2/2008 | Martin et al. | ................. | 361/685 |
| 2008/0101008 A1 * | 5/2008 | Ulrich et al. | .................. | 361/685 |
| 2008/0158808 A1 * | 7/2008 | Camarena et al. | ............ | 361/685 |

FOREIGN PATENT DOCUMENTS
JP 07029363 1/1995
JP 2006190349 7/2006

* cited by examiner

*Primary Examiner* — Jinhee Lee
*Assistant Examiner* — Adrian S Wilson

(57) ABSTRACT

A removable data-storage device. The removable data-storage device includes a main data-storage unit, an exterior housing for containing the main data-storage unit, an elastic shock-reduction part between an inner wall of the exterior housing and the main data-storage unit for reducing a mechanical shock to the main data-storage unit by elasticity and an external connector exposed from an opening of the exterior housing. The main data-storage unit is placed at the rear of the external connector as viewed from the opening. The external connector is joined and secured to the main data-storage unit and the exterior housing. In addition, the elastic shock-reduction part is configured to deform with a movement of the main data-storage unit in the exterior housing produced by a mechanical shock and a movable range of the external connector is smaller than a movable range of the main data-storage unit.

7 Claims, 9 Drawing Sheets

1

(a)

(b)

(a)

(b)

ns of the present invention relate to removable
REMOVABLE DATA-STORAGE DEVICE

CROSS-REFERENCE TO RELATED APPLICATION

This application claims priority from the Japanese Patent Application No. 2008-141760, filed May 29, 2008, the disclosure of which is incorporated herein in its entirety by reference.

TECHNICAL FIELD

Embodime data-storage devices.

BACKGROUND

Hard disk drives (HDDs) have found widespread applications such as moving image recording/reproducing devices and car navigation systems in addition to external storage devices of computers, due to their outstanding characteristics. In this regard, it has been proposed to use a large storage capacity hard-disk drive (HDD) as a removable data-storage device. For example, iVDR (information Versatile Disk for Removable usage) has been standardized as one such removable data-storage device. Two specifications have been set for iVDR. One is the cartridge type iVDR and the other is the built-in type iVDR.

The cartridge type iVDR is specified to be connected to different devices and has an exterior housing, a main HDD contained in the exterior housing and an external connector. On the other hand, the built-in type iVDR is specified to be mounted inside equipment and does not have an exterior housing, although it is removable. A removable HDD, which is connected to arbitrary equipment like the cartridge type iVDR, may be removed from a host device and transferred to another host device or place by a user. Thus, a user may drop the removable HDD by mistake when he or she carries it and it may receive a huge mechanical shock.

SUMMARY

Embodiments of the present invention include a removable data-storage device. The removable data-storage device includes a main data-storage unit, an exterior housing for containing the main data-storage unit, an elastic shock-reduction part between an inner wall of the exterior housing and the main data-storage unit for reducing a mechanical shock to the main data-storage unit by elasticity and an external connector exposed from an opening of the exterior housing. The main data-storage unit is placed at the rear of the external connector as viewed from the opening. The external connector is joined and secured to the main data-storage unit and the exterior housing. In addition, the elastic shock-reduction part is configured to deform with a movement of the main data-storage unit in the exterior housing produced by a mechanical shock and a movable range of the external connector is smaller than a movable range of the main data-storage unit.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
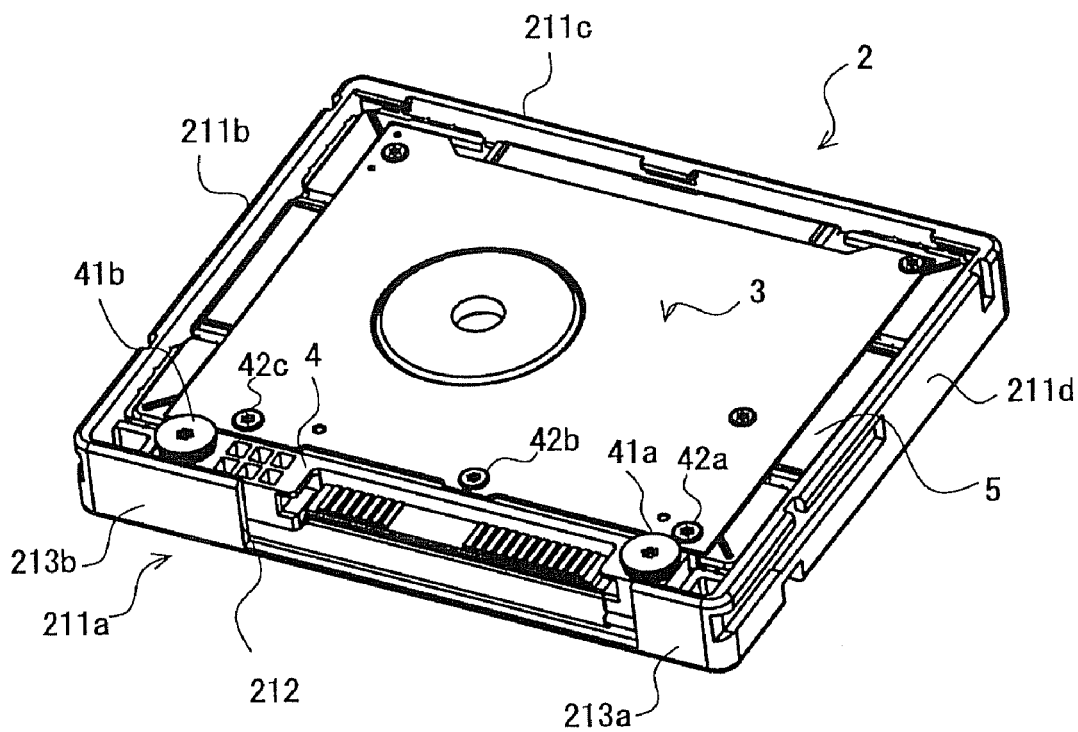
FIG. 1 is a perspective view depicting the structure of a removable data-storage device, for example, a removable hard-disk drive (HDD), in accordance with an embodiment of the present invention.
Figure 1:
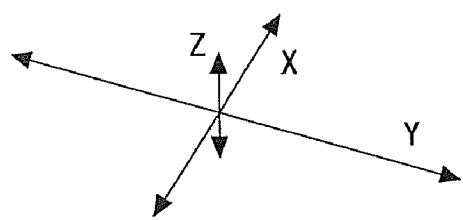

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention.

As set forth herein, the embodiments of the present invention are described by way of specific examples, but embodiments of the present invention are not limited to these examples. A person skilled in the art can easily modify, add, or convert the components within the spirit and scope of embodiments of the present invention. For example, although the embodiments of the present invention are subsequently described for the example of a removable HDD, embodiments of the present invention may be applied to removable data-storage devices in general.

DESCRIPTION OF EMBODIMENTS OF THE PRESENT INVENTION FOR A REMOVABLE DATA-STORAGE DEVICE

In accordance with embodiments of the present invention, descriptions are given to a removable hard disk drive (HDD) as an example of a removable data-storage device, and a main HDD as an example of a main data-storage unit. In accordance with embodiments of the present invention, a technique has been proposed to insert a cushion between the exterior housing and the main HDD to resist the external mechanical shock that may be produced when the removable HDD is dropped. The cushion is designed to be sufficiently deformable in response to a mechanical shock so that the mechanical shock to the main HDD is effectively reduced. If the cushion is hard and deforms little, the mechanical shock to the exterior housing may be transmitted to the main HDD without reduction. Therefore, to reduce the mechanical shock applied to the main HDD effectively, the cushion is designed to deform sufficiently under shock so that the main HDD can move under mechanical shock inside the exterior housing.

In accordance with embodiments of the present invention, since the removable hard-disk drive (HDD) is connected to many different devices, the specifications of the external connector have been defined. In particular, specifications for the structure of the connector and the position relative to the exterior housing have been defined. Under these specifications, the external connector needs to be positioned precisely to the exterior housing and a positioning margin of the external connector to the exterior housing is limited. On the other hand, the main HDD, as described above, is required to be able to move with deformation of the cushion for reducing a mechanical shock to the main HDD. For example, when a circuit board of the main HDD is connected via a flexible printed circuit (FPC) with the external connector, a movement of the main HDD is independent of the external connector. Thus, it is possible to position the external connector precisely to the exterior housing and attain some range of movement of the main HDD within the exterior housing.

In accordance with embodiments of the present invention, since the removable HDD may be carried, the outer dimensions are small. If the sizes of the main HDD and the exterior housing are similar, the space for containing the main HDD may be limited. Thus, the external connector can not be placed at a distance from the main HDD and the external connector is mounted on the circuit board of the main HDD. In such a configuration, the external connector moves with the main HDD. Therefore, embodiments of the present invention for the removable HDD, which has an external connector secured to the main HDD, provide a high resistance against a mechanical shock from outside and precise positioning of the external connector at the same time, which are subsequently described.

In accordance with an embodiment of the present invention, a removable data-storage device includes a main data-storage unit, an exterior housing for containing the main data-storage unit, an elastic shock-reduction part between an inner wall of the exterior housing and the main data-storage unit for reducing a mechanical shock to the main data-storage unit by elasticity, and an external connector exposed from an opening of the exterior housing. The main data-storage unit is placed at the rear of the external connector as viewed from the opening. The external connector is joined and secured to the main data-storage unit and the exterior housing. The elastic shock-reduction part is configured to deform with a movement of the main data-storage unit in the exterior housing under mechanical shock and a movable range of the external connector is smaller than a movable range of the main data-storage unit. This configuration is designed to provide a high resistance against a mechanical shock from outside and precise positioning of the external connector in the removable data-storage device.

In accordance with one embodiment of the present invention, the main data-storage unit includes an assembly including a box shaped disk enclosure (DE) and a control circuit board on an outer surface of the DE, and the control circuit board and the external connector are secured to the DE with the same fastener. This configuration is designed to provide a high resistance against a mechanical shock from outside.

In accordance with another embodiment of the present invention, the elastic shock-reduction part comprises a part selected from the group consisting of a single elastic resin member and a plurality of separated elastic resin members that are placed between the main data-storage unit and an inner wall of the exterior housing to reduce a mechanical shock in a movement of the main data-storage unit in any direction. This configuration is designed to provide protection of the main data-storage unit from an external mechanical shock in any direction.

In accordance with another embodiment of the present invention, the elastic shock-reduction part comprises a part selected from the group consisting of a single elastic resin member and a plurality of separated elastic resin members and includes a plurality of projections contacting the main data-storage unit, or an inner wall of the exterior housing, or both the main data-storage unit and an inner wall of the exterior housing. The elastic shock-reduction part is designed to absorb both a vibration and a mechanical shock effectively. In another embodiment of the present invention, the main data-storage unit is joined to only the external connector. This configuration is also designed to provide protection of the main data-storage unit more from an external mechanical shock.

In accordance with another embodiment of the present invention, the removable data-storage device further includes a shaft restricting a movement of the external connector; and the external connector is joined and secured to the exterior housing via the shaft. This configuration is designed to provide for joining and securing the connector to the exterior housing. In another embodiment of the present invention, the shaft includes two screw shafts secured together so as to sandwich the external connector and the exterior housing.

In accordance with an embodiment of the present invention, the removable data-storage device further includes a resin bushing between an outer surface of the shaft and an inner surface of a hole of the external connector. This configuration is designed to prevent breakage of the connector. In another embodiment of the present invention, the external connector has a greater movable range in an insertion and extraction direction to an external device than the movable ranges in the other two directions vertical to the insertion and extraction direction. In addition, the external connector has a hole where the shaft penetrates and which is vertical to the insertion and extraction direction. Also, a diameter of the hole in the insertion and extraction direction is larger than a diameter in a direction vertical to the insertion and extraction direction. Moreover, the resin bushing includes a first flat-layer portion and a second layer portion in the direction of the larger diameter, in which the second layer portion has projections and depressions; the first flat-layer portion contacts the shaft and the inner surface of the hole in the direction of the smaller diameter. This configuration is designed to provide for protection of the data-storage unit in the insertion and extraction direction and to prevent a shift in the position of the connector.

In accordance with an embodiment of the present invention, the external connector has a greater movable range in an insertion and extraction direction of an external device than the ranges in the other two directions which are vertical to the insertion and extraction direction, respectively. This configuration is designed to provide for a high resistance against a mechanical shock from outside and precise positioning of the external connector.

Figure 4:
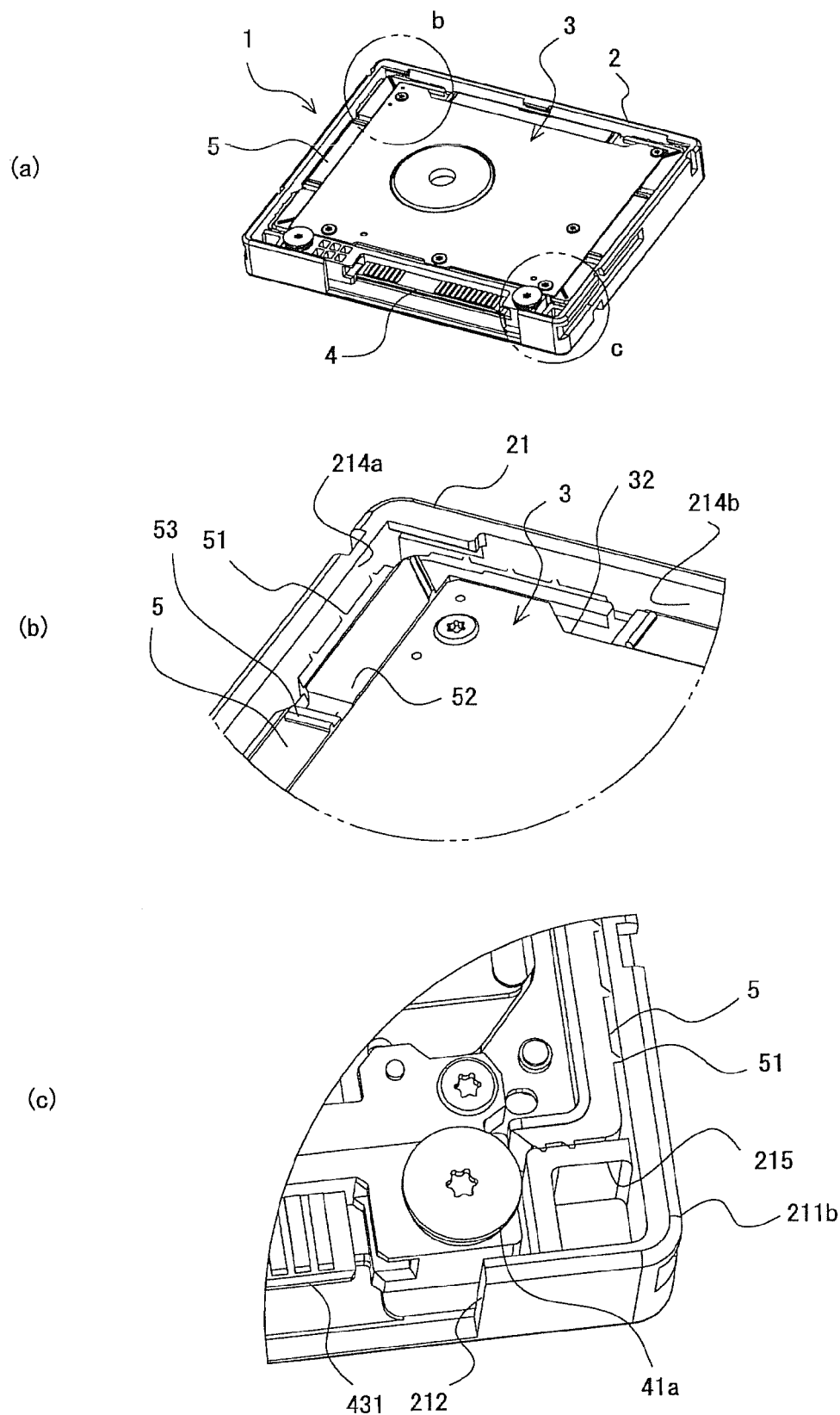
FIG. 4 are drawings illustrating a rubber mount, in accordance with an embodiment of the present invention.

With reference now to FIG. 1, in accordance with an embodiment of the present invention, a perspective view depicting the structure of a removable HDD 1 is shown. Throughout the drawings, like components are denoted by like reference numerals, and their repetitive description is omitted if not necessary for clarity of explanation. A HDD 1 is a data-storage unit for storing data using a magnetic-recording disk as a medium for storing data. The removable HDD 1 has an exterior housing 2, a main HDD 3, which is the main data-storage unit, placed in the exterior housing 2; and, an external connector 4 exposed from an opening 212 of the exterior housing 2 to be connected to an external host. FIG. 1 depicts only a base 21 of the exterior housing 2, and a cover 22 for closing an opening of the base 21 (refer to FIG. 4) is not shown. Thus, the main HDD 3 is shown in FIG. 1 as it would appear contained in and exposed within the exterior housing 2. In the exterior housing 2, the main HDD 3 is located at the rear of the external connector 4 as viewed from the opening 212.

With further reference to FIG. 1, in accordance with an embodiment of the present invention, the main HDD 3 is mounted in the exterior housing 2 via rubber mount 5, which is an elastic shock-reduction part. The external connector 4 is joined and secured to the exterior housing 2 with screws 41a, 41b, which are fasteners. The external connector 4 is joined and secured to the main HDD 3 with screws 42a-42c, which are fasteners. The joining and securing of the external connector 4 will be described later. The base 21 of the exterior housing 2 has a quadrilateral bottom face and four walls 211a-211d rising from the bottom face. The opening 212 is formed in the wall 211a and the external connector 4 is connected to a host device through the opening 212. The wall 211a consist of parts 213a, 213b sandwiching the opening 212. Typically, the exterior housing 2 is made of resin and the base 21 and cover 22 are manufactured by resin molding. The bottom face and the cover 22 are wide main faces. The four side faces 211a-211d between them are narrow cross faces.

With further reference to FIG. 1, in accordance with an embodiment of the present invention, the X-direction is the insertion and extraction direction of the removable HDD 1 to and from an external host. The Y-direction along the wide face, which is the main face, is vertical to the X-direction, and the Z-direction is vertical to the X-direction and Y-direction. Hereinafter, the X-direction is called the front-rear direction, the Y-direction is called the left-right direction and the Z-direction is called the top-bottom direction.

Figure 2:
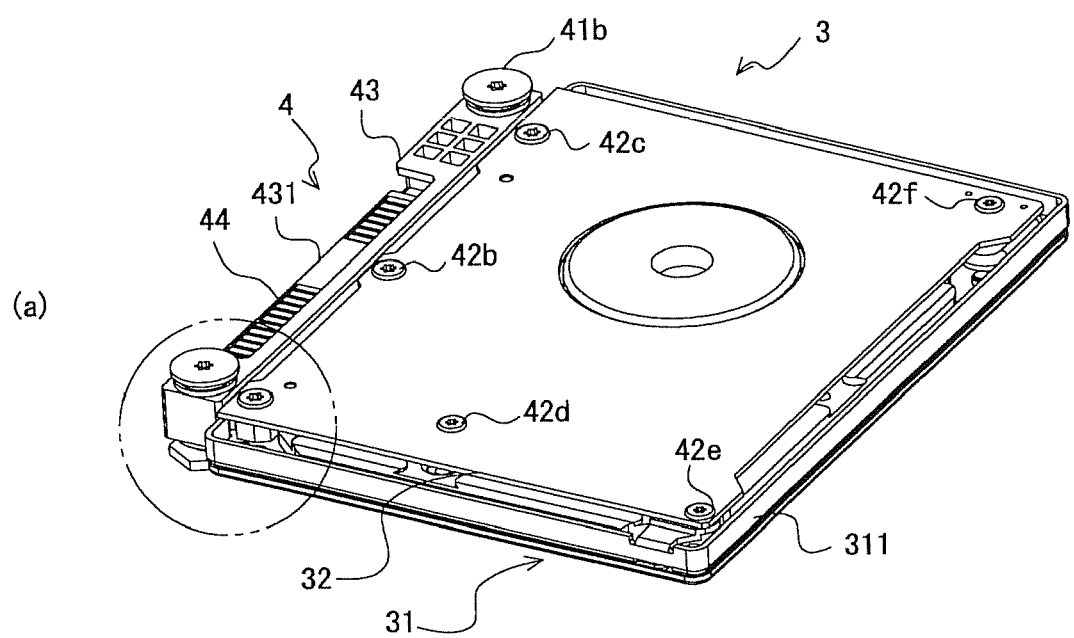
FIG. 2 are perspective views depicting the structure of an assembly consisting of a main data-storage unit, for example, a main HDD, and an external connector, in accordance with an embodiment of the present invention.
Figure 2:
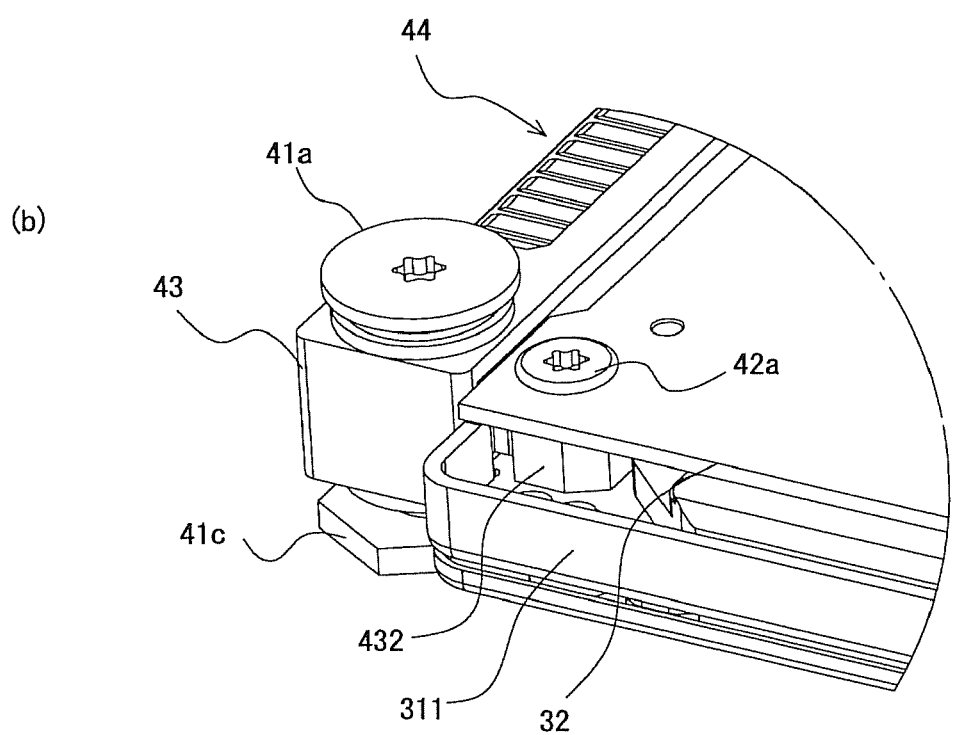

With reference now to FIG. 2, in accordance with an embodiment of the present invention, a perspective view depicting an assembly of the main HDD 3 and the external connector is shown. FIG. 2(b) is an enlarged view of a part circled in FIG. 2(a). The main HDD 3 has a head disk assembly (HDA) 31 and a control circuit board 32 placed on an outer surface of the HDA 31. The HDA 31 consists of a box shaped DE 311 and parts contained therein. The DE 311 is typically made of a metal like an aluminum alloy.

Figure 3:
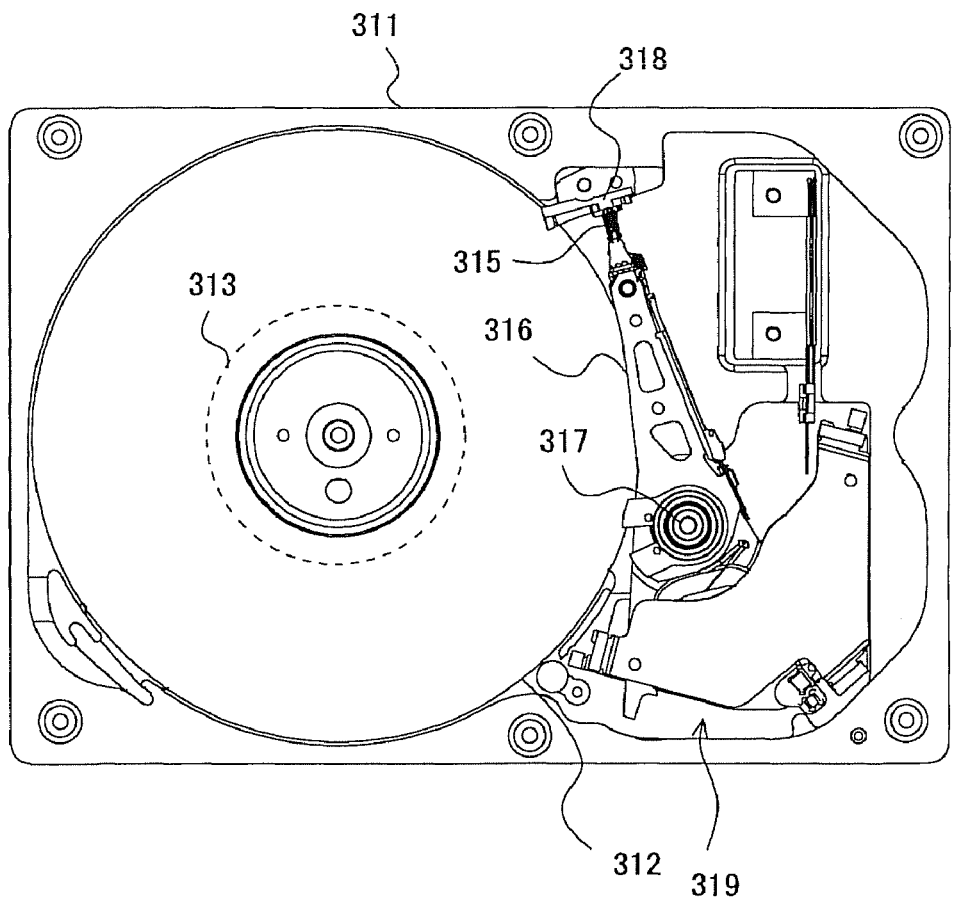
FIG. 3 is a plan view of the structure within a disk enclosure (DE) of a head-disk assembly (HDA), in accordance with an embodiment of the present invention.

With reference now to FIG. 3, in accordance with an embodiment of the present invention, a plan view depicting the internal structure of the DE 311 of the HDA 31 is shown. A controller circuit on the control circuit board controls operations of components in the space within the DE 311. A head slider 315 accesses a magnetic-recording disk 312, which is a data-storage disk, for reading and writing data thereto. The head slider 315 has a magnetic-recording head for writing data outputted from the magnetic-recording disk 312 to an external host (not shown) and/or reading data inputted to the magnetic-recording disk 312 from the external host. An actuator 316 supports the head slider 315 and is driven by a voice coil motor (VCM) 319 to rotate about a pivot shaft 317. The assembly of the actuator 316 and the VCM 109 provide a mechanism that serves to move the head slider 315. The VCM 319 consists of elements such as a flat coil 113 and a stator magnet (not shown). A spindle motor 313 fixed to the DE 311 spins a magnetic-recording disk 101 at a specific angular rate. To read data from or write data to the magnetic-recording disk 312, the actuator 316 moves the head slider 315 to a location above the data area on the surface of the magnetic-recording disk 312. The pressure induced by the air viscosity between the air-bearing surface (ABS) of the slider and the spinning magnetic-recording disk 312 balances the pressure applied by the actuator 316 toward the magnetic-recording disk 312, so that the head slider 315 flies over the magnetic-recording disk 312 at a fly height (FH) defined by the gap between the head slider 315 and the magnetic-recording disk 312. When the magnetic-recording disk 312 begins to stop spinning, the actuator 316 moves the head slider 315 from a data area to a ramp 318. Embodiments of the present invention can also be applied to the contact start and stop (CSS) scheme where the head slider 315 is moved to park on a zone provided near the inner diameter of the magnetic-recording disk 312 when the head slider 315 does not write or read data. The HDA 31 may include one or more single-sided or double-sided magnetic-recording disks.

With reference once again to FIGS. 2(a) and 2(b), in accordance with an embodiment of the present invention, the control circuit board 32 is secured on a surface of the DE 311 of the HDA 31 with the screws 42a-42f. The screws 42a-42c join and secure the external connector 4 and the control circuit board 32 to the DE 311 of the HDA 31. The external connector 4 is placed at one edge of the control circuit board 32 and DE 311. Although not shown, the external connector 4 and the control circuit board 32 are connected electrically and physically and transmit signals between an external host and the controller circuit on the control circuit board 32. Typically, terminal pads of the external connector 4 and terminal pads of the control circuit board 32 are connected by solder joints.

With reference once again to FIGS. 2(a) and 2(b), in accordance with an embodiment of the present invention, hereinafter, the face where the control circuit board 32 is placed is called the top face of the HDA 31; the opposite face is called the bottom face; and the four faces between the top face and the bottom face are called side faces. The side face, where the external connector is placed, is called the front face; the opposite face is called rear face; and the side faces between the front face and the rear faces are called right and left side faces, respectively.

With reference now to FIGS. 4(a), 4(b) and 4(c), in accordance with an embodiment of the present invention, the rubber mount 5 in the exterior housing 2 reduces the mechanical shock to protect the main HDD 3 from the mechanical shock, for example, which may be produced if the removable HDD 1 is dropped. FIG. 4(a) is the same figure as FIG. 1. FIG. 4(b) is an enlarged view of a part that lies in circle b of FIG. 4(a).

FIG. 4(c) is an enlarged view of a part that lies in circle c of FIG. 4(a) and the control circuit board 32 has been removed from the figure to aid in the following description. The rubber mount 5 covers the entire surface of each side face of the HDA 31 except for the front face, which is the front edge, at which the external connector 4 is placed. In the normal state, the rubber mount 5 is present between the main HDD 3 and the exterior housing and deformed slightly. The small inertia during conveyance of the removable HDD 1 does not substantially move the main HDD 3 in the exterior housing 2. The rubber mount 5 contacts both the main HDD 3 and the exterior housing 2. The rubber mount 5 keeps the main HDD 3 separated from the top, bottom, right, left, front and rear inner surfaces of the exterior housing. A mechanical shock produced by dropping causes an inertial movement of the main HDD 3 in the exterior housing 2 and a part of the rubber mount 5 deforms with the movement of the main HDD 3. The deformation of the rubber mount 5 absorbs the external mechanical shock to reduce the mechanical shock to the main HDD 3.

With further reference to FIG. 4(b), in accordance with an embodiment of the present invention, a part of the rubber mount 5 is sandwiched between the right face and the inner surface 214a of the base of exterior housing 21, and another part is sandwiched between the rear face of the HDA 31 and the inner surface 214b of the base of exterior housing 21. Another part of the rubber mount 5 is present between the bottom face of the HDA 31 and inner bottom face of the base of exterior housing 21. Although not shown in the figure, another part of the rubber mount 5 is placed between the top face of the HDA 31 and the cover 22. Although the rubber mount 5 does not overlap the control circuit board 32 as viewed in the spindle direction, the top face of the rubber mount 5 is present closer to the cover 22 than the control circuit board 32 and the control circuit board 32 is separated from the cover 22. In another embodiment of the present invention, the rubber mount 5 has a plurality of projections 51 on the sides facing the inner walls of the base 21. The projections 51 are separated from one another along the inner walls. These projections 51 can absorb small vibrations. Furthermore, a continuous part 52, which is a base of the projections 51, can also provide the mechanical-shock absorption function. The projections 51 may be formed on the sides facing the HDA 31. In another embodiment of the present invention, projections are formed, in addition, on the top and bottom faces in the spindle direction. In the example embodiment of the present invention of FIG. 4(b), the rubber mount 5 has a plurality of projections 53 on the top face.

With further reference to FIG. 4(c), in accordance with an embodiment of the present invention, a corner of the HDA 31 is shown at the side where the external connector 4 is mounted. The rubber mount 5 is inserted between the front face, right face of the HDA 31 and the inner wall surfaces of the base of the exterior housing 21. The rubber mount 5 covers a part of the front face of the HDA 31 where the external connector 4 is mounted. A wall 215 protruding from a side wall toward the HDA 31 is formed in the base of the exterior housing 21 and a part of the rubber mount 5 is inserted between the wall and the front face of the HDA 31. Moreover, in another embodiment of the present invention, the rubber mount 5 may be inserted between each of the side faces of the HDA 31 and an inner surface of the exterior housing 2; and the rubber mount 5 protects the HDA 31 from a mechanical shock in the front-rear direction and left-right direction parallel to the magnetic-recording-disk surface. Furthermore, in another embodiment of the present invention, the rubber mount 5 may be placed between the main HDD 3 and inner walls of the exterior housing 2 such that it can reduce a mechanical shock to the main HDD 3 in a movement in any direction including the direction parallel to the spindle, which is the top-bottom direction. In the above described embodiment of the present invention, the rubber mount 5 is formed integrally and covers the entire right, left and rear faces. The rubber mount 5, however, may cover only a part of the each face. For example, four separated rubber mounts placed at corners of the side faces of the HDA 31 respectively can protect the main HDD 3 from external mechanical shocks. This configuration keeps the main HDD 3 separated from the front, rear, top, bottom, right and left inner surfaces of the exterior housing by the rubber mounts and protects the main HDD 3 from mechanical shocks in all directions.

With reference once again to FIGS. 2(a) and 2(b), in accordance with an embodiment of the present invention, the external connector 4 includes a connector body part 43 and external connection pads 44 formed on the connector body part 43. The connector body part 43 has a plate 431 protruding outward and the external connection pads 44 are arranged thereon. The external connection pads 44 are arranged in the left-right direction. In the connector body part 43, screws 41a, 41b, which are secured at right and left positions so as to sandwich the external connection pads 44, are screws for securing the external connector 4 to the exterior housing 2 and are not joined to the main HDD 3. The screws 41a, 41b are joined with opposing screws on the back of the external connector 4 (only opposing screw 41c to the screw 41a is shown). The securing of the external connector 4 to the exterior housing 2 with the screws 41a, 41b and the opposing screws will be described later.

With further reference to FIG. 2(b), in accordance with an embodiment of the present invention, the screw 42a penetrates a hole of the control circuit board 32 and a part of the connector body part 432; and the screw 42a secures the control circuit board 32 and the external connector 4 to the DE 311 of the HDA 31. The screw 42b shown in FIG. 2(a) has the same structure. An embodiment of the present invention provides for securing of the external connector 4 and the HDA 31. If an external mechanical shock produced by dropping the removable HDD 1 moves the main HDD 3 in the exterior housing 2, the control circuit board 32 moves with the HDA 31. The external connection pads 44 of the external connector 4 and pads on the control circuit board 32 are soldered together and the soldered connection may brake under a heavy load. Therefore, holding the external connector 4 and the HDA 31 securely with screws provides for reduction of a load on the interconnection between the external connector 4 and the control circuit board 32 when the main HDD 3 is moved in the exterior housing 2 by a mechanical shock.

With further reference to FIG. 2(a), in accordance with an embodiment of the present invention, the control circuit board 32 is held securely with the screws 41a, 41b on the HDA 31 together with the external connector 4. In accordance with one embodiment of the present invention, to reduce the load on the interconnects between the external connector 4 and the control circuit board 32, the external connector 4 and the control circuit board 32 are held securely together on the HDA 31 with the same screws. The control circuit board 32 on the HDA 31 and the external connector 4, however, may be secured individually to the HDA 31, and the control circuit board 32 may be secured with screws or may be pressed against or bonded to the HDA 31 with a member different from a screw.

Figure 5:
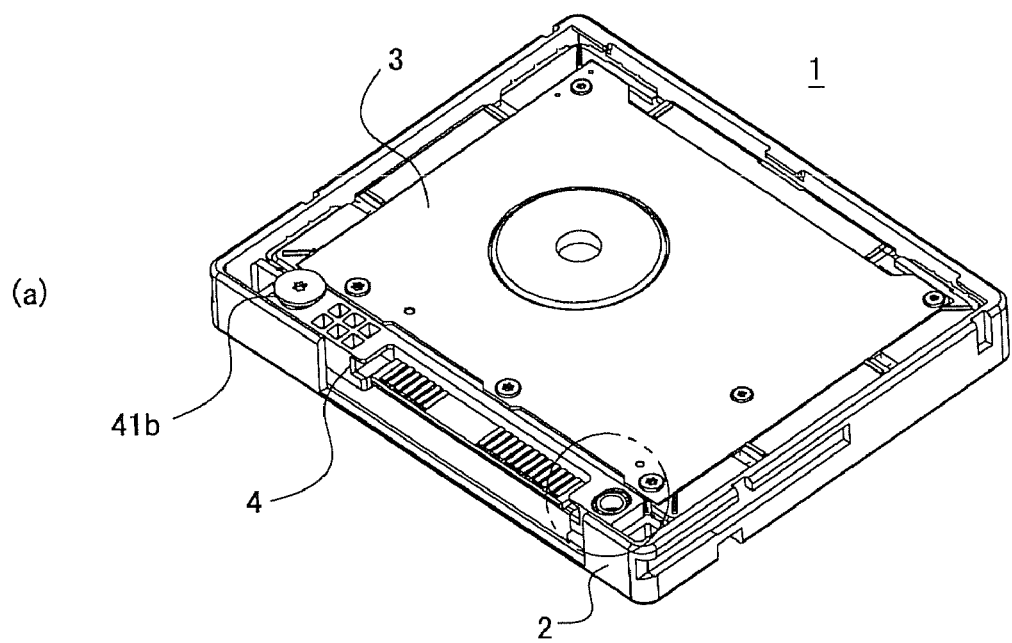
FIG. 5 are perspective views illustrating screws for securing an external connector to an exterior housing and the structure of their corresponding receiving parts, in accordance with an embodiment of the present invention.
Figure 5:
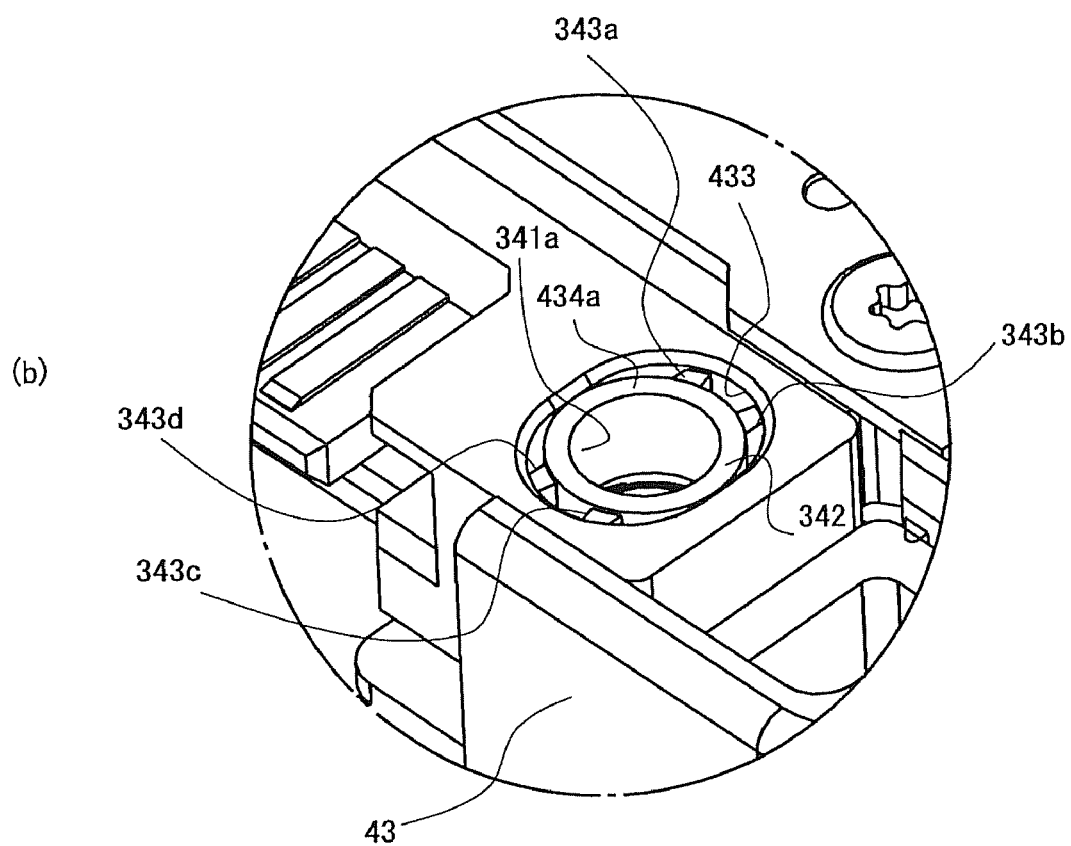

With reference now to FIGS. 5(a) and 5(b), in accordance with an embodiment of the present invention, perspective views depicting the screws 41a, 41b for securing the external connector 4 to the exterior housing 2 and the structure of corresponding receiving parts thereof are shown. FIG. 5(b) is an enlarged view of a part that is circled in FIG. 5(a). In the removable HDD 1 illustrated in FIGS. 5(a) and 5(b), the cover 22 and the screw 41a are removed, and the cross-section of a rubber bushing 434a is depicted. As shown in FIG. 5(b), the body part of the external connector 43 has a trough-hole 433 in the top-bottom direction and the screw 41a is inserted in trough-hole 433. Furthermore, the rubber bushing 434a is inserted in the trough-hole 433. The screw 41a is inserted in a trough-hole 341a extending in the top-bottom direction in the middle of the rubber bushing 434a. The trough-hole 433 is oval, and the diameter in the insertion and extraction direction of the external connector 4 to and from a host device, which is the front-rear direction, is larger than the diameter in the left-right direction vertical to it, which is the direction along which the external connection pads 44 are arranged. Furthermore, the rubber bushing 434a has a two layer structure and includes a ring part 342, which is configured as a first flat-layer portion with a trough-hole 341a, and a second layer portion with projections and depressions such that the projections 343a-343d lie on the outer surface of the ring part 342.

With further reference to FIGS. 5(a) and 5(b), in accordance with an embodiment of the present invention, the ring part 342 is substantially circular as viewed in the through-way direction of the hole 341a. The ring part 342 contacts the inner surface adjacent to the hole 433 of the external connector in the shorter diameter direction of the hole 433. A screw shaft contacts the inner surface adjacent to a hole 341a of the ring part 342. The projections 343a-343d contact the inner surface adjacent to the hole 433 in the longer diameter direction of the hole 433, and the ring part 342 is separated from the inner surface of the hole 433. Thus, the deformable amount of the rubber bushing 434a in the longer diameter direction of the hole 433, which is the front-rear direction of the HDA 31, is larger than the one in the shorter diameter direction. The projections 343a-343d serve to position the rubber bushing 434a in the longer diameter direction and allows a greater deformation of the rubber bushing 434a in the longer diameter direction. The effects of the shape of the rubber bushing 434a and the difference in the amount of deformation of the rubber bushing 434a will be described later. The projections 343a-343d may be formed on the inner surface of the rubber bushing 434a.

Figure 6:
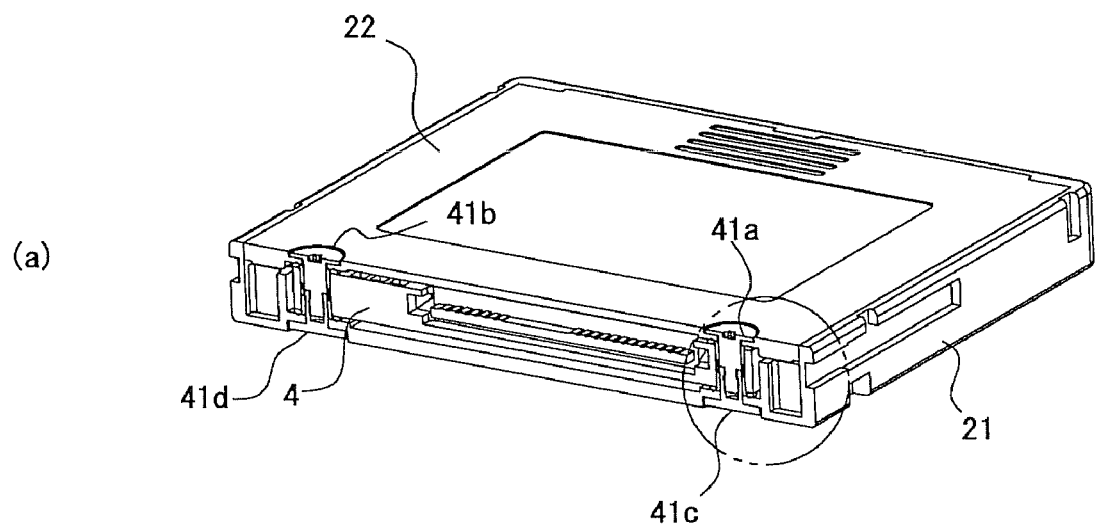
FIG. 6 are cross-sections illustrating screws for securing an external connector to an exterior housing and the structure of their corresponding receiving parts, in accordance with an embodiment of the present invention.
Figure 6:
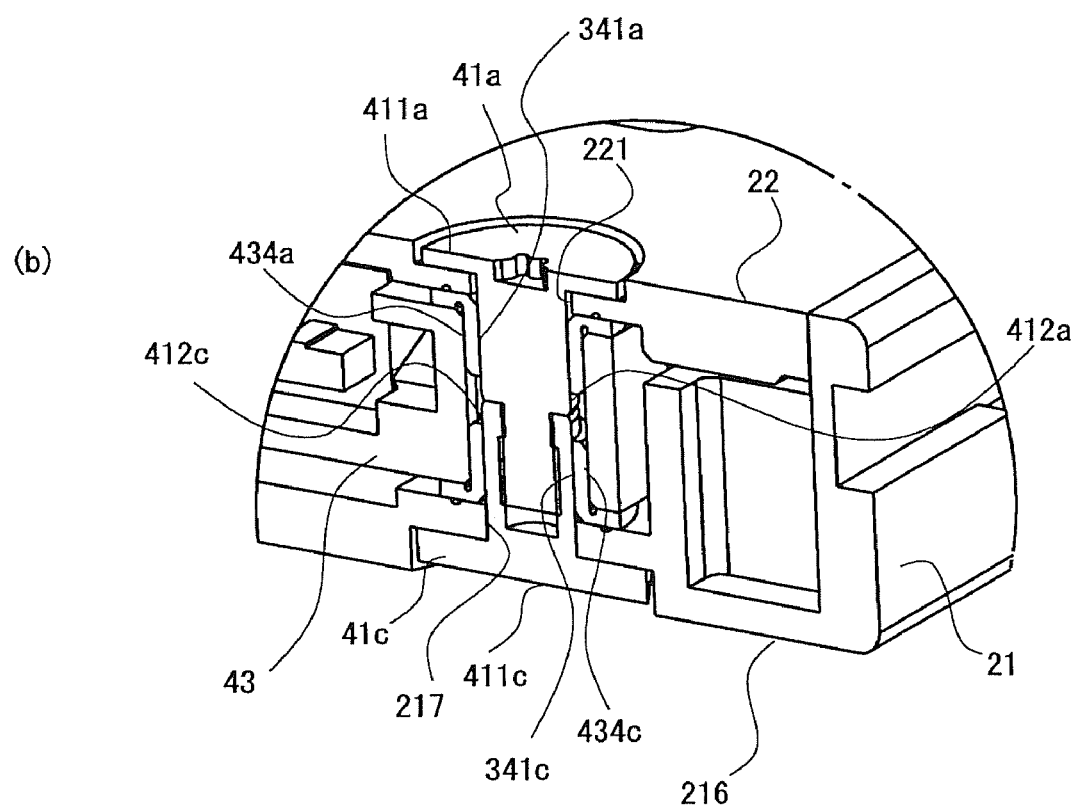

With reference now to FIGS. 6(a) and 6(b), in accordance with an embodiment of the present invention, cross-sections depicting the screws 41a, 41b for securing the external connector 4 to the exterior housing 2 and the structure of their corresponding receiving parts are shown. FIG. 6(b) is an enlarged view of a part circled in FIG. 6(a). As illustrated in FIG. 6(a), the screws 41a, 41b are fitted into the corresponding receiving parts, which are the screws 41c, 41d, respectively. The screws 41a, 41b penetrate the cover 22 and the screws 41c, 41d penetrate the bottom face of the base 21. FIG. 6(b) depicts the screws 41a, 41c and the structure around them. The screws 41b, 41d and the surroundings have the same structure. The screw 41a is a male screw and the screw 41c is a female screw. The screw 41a passes through the hole 221 of the cover 22. The screw head 411a of the screw 41a is present outside of the cover 22 and presses the cover 22 against the external connector 4. The screw shaft 412a of the screw 41a penetrates the hole of the cover 221, the hole of the external connector 433 and the hole in the middle of the rubber bushing 341a. The screw shaft 412a is fitted into and secured to the shaft of the screw 41c. A part of the rubber bushing 434a is present between the cover 22 and the external connector body part 43 and another part of the rubber bushing 434a is present between the inner wall of the hole 433 of the external connector and the screw shaft 412a.

With further reference to FIGS. 6(a) and 6(b), in accordance with an embodiment of the present invention, the screw 41c passes through the hole 217 of the base bottom 216, and the screw head 411c of the screw 41c is outside of the base bottom 216 and presses the base bottom 216 against the external connector 4. The screw shaft 412c of the screw 41c penetrates the hole of the base bottom 217, the hole of the external connector 433 and the center hole of the rubber bushing 434c mounted in the hole 433. A part of the rubber bushing 434c is present between the base 21 and the external connector body part 43, and another part of the rubber bushing 434c is present between the inner wall of the hole of external connector 433 and the screw shaft 412c of the screw 41c. The screw shaft 412c of the screw 41c passes through the center hole 341c of the rubber bushing 434c.

With further reference to FIGS. 6(a) and 6(b), in accordance with an embodiment of the present invention, the screw 41a and the screw 41c are fit together and secured so that the base 21, the rubber bushing 434a, 434c, the external connector 4 and the cover 22 are sandwiched between the screw head 411a of the screw 41a and the screw head 411c of the screw 41c. This configuration secures the external connector 4 to the exterior housing 2. The outer diameters of the screw shaft 412c of the screw 41c and the screw shaft 412a of the screw 41a are the same. The rubber bushing 434a, 434c have the same structure. The cover 22 and base 21 are secured together with an engaging structure formed at a position different from the positions of the screws 41a-41d.

With further reference to FIGS. 6(a) and 6(b), in accordance with an embodiment of the present invention, as described above, the main HDD 3 is mounted within the exterior housing 2 via the rubber mount 5. The main HDD 3 is not joined to the exterior housing 2 but joined to only the external connector 4. Namely, the external connector 4 is held securely in the exterior housing 2 with the screws 41a-41d; the main HDD 3, however, is not joined nor secured to the exterior housing 2 with fasteners such as screws and pins and is held loosely in the exterior housing 2 with the rubber mount 5. The external connector 4 is joined and secured to the exterior housing 2 via the screw shaft 412c, 412a joined together to constitute a shaft. The screw shaft 412c, 412a do not substantially move relative to the exterior housing 2 and the external connector 4 can move relative to the exterior housing 2 only within the deformable range of the rubber mount. Thus, the configuration can increase the stroke of the main HDD 3 moved in the exterior housing 2 and the amount of deformation of the rubber mount 5 produced by a mechanical shock, while providing a movable range of the external connector 4 smaller than the movable range of the main HDD 3 within a defined specific range.

Figure 7:
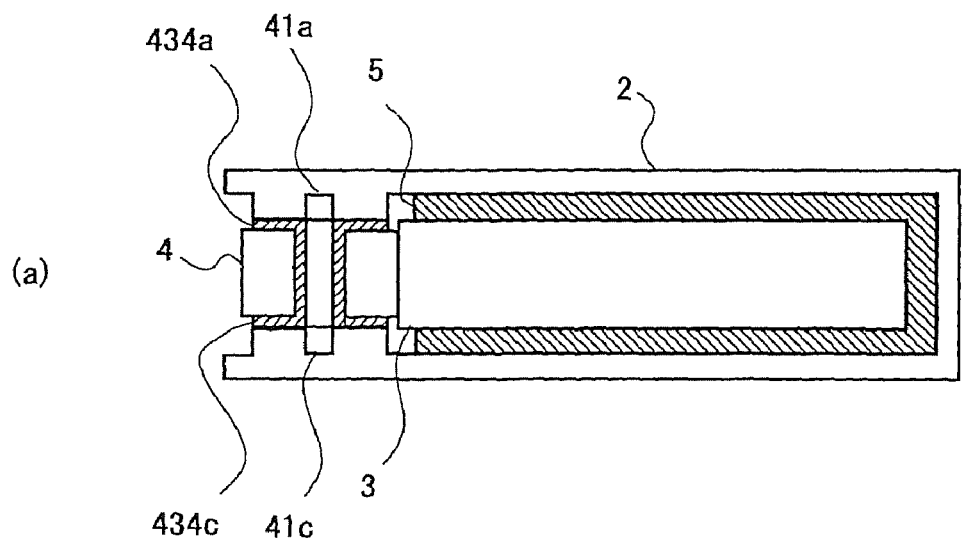
FIG. 7 are cross-sectional views illustrating a movement of the main data-storage unit, for example, the main HDD, and the external connector in an exterior housing, in accordance with an embodiment of the present invention.
Figure 7:
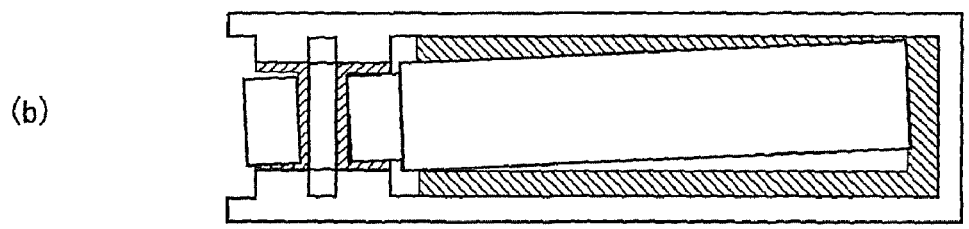

With reference now to FIG. 7, in accordance with an embodiment of the present invention, a cross-sectional view illustrating a movement of the main HDD 3 and external connector 4 in the exterior housing 2 is shown. When a mechanical shock is applied to the outside of the exterior housing 2, the main HDD 3 moves by inertia while pressing and deforming the rubber mount 5. Since the main HDD 3 is not held securely in the exterior housing 2, the movement of the main HDD 3 depends only on the elastic deformation of the rubber mount 5. Since the external connector 4 is joined and secured to the main HDD 3 and HDA 31 with the screws 42a, 42b, it moves with the main HDD 3. However, the external connector 4 is joined and secured to the exterior housing 2 with the screws 41a-41d, because the external connector 4 is distinct from the main HDD 3. The screws 41a-41d do not move substantially relative to the exterior housing 2. Therefore, the exterior housing 2 can move within the deformable range of the rubber bushings 434a, 434c. By using rubber bushings thinner than a rubber mount or selecting harder material for the rubber bushings than that of the rubber mount, the deformable ranges of the rubber bushings may be made smaller than the deformable range of the rubber mount so that the movement of the external connector 4 can be controlled.

With further reference to FIG. 7, in accordance with an embodiment of the present invention, the position margin of the external connector 4 relative to the exterior housing 2 is defined for a connection with an external host. As describe above, the allowed movement of the external connector 4 is limited more than the allowed movement of the main HDD 3 so that the movement of the external connector 4 can be restricted within a defined range even if the main HDD 3 is moved by an external mechanical shock. On the other hand, a larger stroke of the main HDD 3 within the exterior housing is allowed so that the mechanical-shock absorbency of the rubber mount 5 increases. The allowed maximum stroke of the main HDD 3 depends on the elasticity of the rubber mount 5. A material with suitable elasticity may be selected for the rubber mount 5 depending on the sizes of the exterior housing 2 and the main HDD 3, and the mechanical-shock absorbency of the rubber mount 5. In one embodiment of the present invention, the rubber mount 5 may absorb a mechanical shock from any direction to the main HDD 3. The rubber mount 5 described referring to FIGS. 4(a)-4(c) is present between the front, rear, top, bottom, right, left faces and inner walls of the exterior housing and reduces mechanical shocks from all directions.

With further reference to FIG. 7, in accordance with an embodiment of the present invention, the position margin of the external connector is typically larger in the insertion and extraction direction of the external connector 4, which is the front-rear direction, than the position margin of the external connector in other directions. Furthermore, an allowed maximum stroke, which is the amount of deformation of the rubber mount 5, is provided to reduce a mechanical shock to the main HDD 3 in the insertion and extraction direction. Therefore, in the embodiment of the present invention described in the discussion of FIG. 5(b), the elasticity of the rubber bushing 434a is smaller in the front-rear direction than that in the left-right direction. Specifically, the hole 433, where the rubber bushing 434a is inserted, is oval and the diameter in the front-rear direction is larger than the diameter in the left-right direction. Furthermore, the rubber bushing 434a has projections on the front and rear sides. Therefore, the rubber bushing 434a has a smaller elasticity in the front-rear direction than that in the left-right direction and can be deformed more in the front-rear direction. In other words, the rubber bushing 434a has a larger maximum stroke in the front-rear direction. Similarly, the other rubber bushings have the same structure. The external connector 4 is secured to the exterior housing with the screws 41a-41d penetrating the exterior housing in the top-bottom direction. The external connector 4 and the main HDD 3 are arranged in the front-rear direction. The main HDD 3 can move to tilt in the left-right direction and the top-bottom direction centered at the screws 41a-41d. However, the movable range is the same as the amount of deformation of the rubber bushing in the front-rear direction. Thus, an increase in the amount of deformation of the rubber bushing allows a larger reduction of the effects of a mechanical shock in the front-rear direction.

Figure 8:
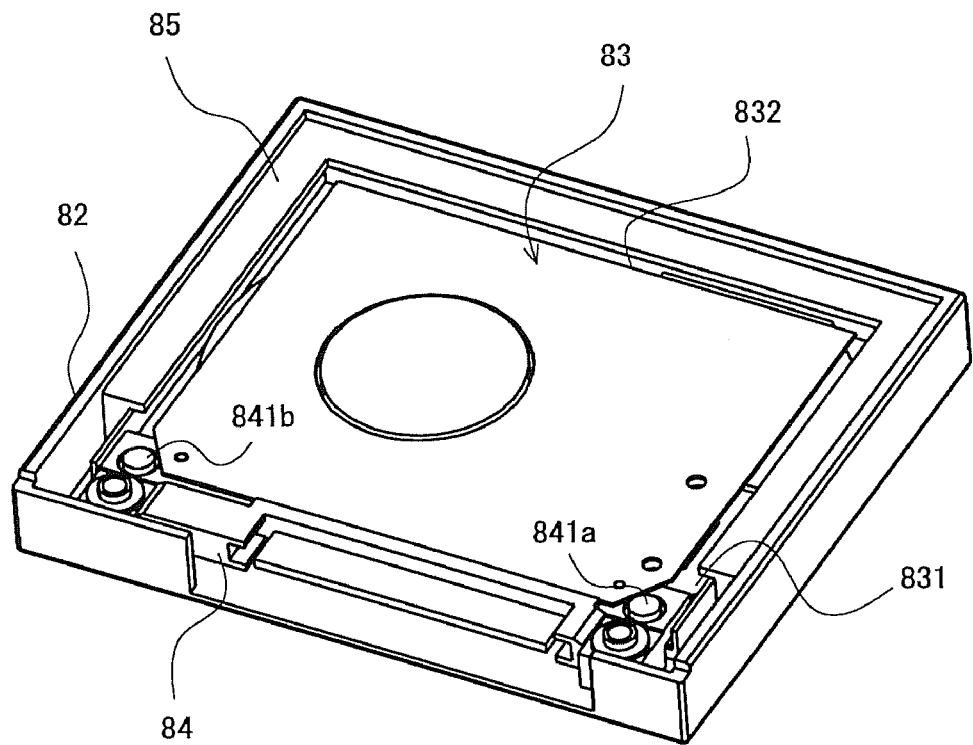
FIG. 8 is a perspective view depicting the structure of a removable data-storage device, for example, a removable HDD, in accordance with an embodiment of the present invention.

With reference now to FIG. 8, in accordance with an embodiment of the present invention, another embodiment of the present invention for the securing structure of the main HDD 3 and the external connector is next described. A perspective view depicting a removable HDD 8 is shown. As shown in FIG. 8, screws for securing a cover of an exterior housing 82 and an external connector 84 to the exterior housing 82 are absent from the figure so as not to obscure the following discussion. A main HDD 83 is placed in a base 821 of the exterior housing 82 via a rubber mount 85. The rubber mount 85 covers three edges, which are the right, left and read faces, of an HDA 831 of the main HDD 83. The main HDD 83 is held loosely in the exterior housing 82 like the main HDD 3. In this example, the rubber mount 85 is not present between the front face of the HDA 831 and an inner wall of the exterior housing 82. Even if a large movable range of the main HDD 3 and deformation of the rubber mount 85 are not achieved in all directions, the mechanical shock resistance of the main HDD 83 can be increased if the movable range of the main HDD 3 and deformation of the rubber mount 85 are achieved at least in specific directions. The basic structure of the external connector 84 is the same as the basic structure of the external connector 4. The external connector 84 is held securely on the HDA 831 with screws 841a, 841b. The screws 841a, 841b are present outside of a control circuit board 832 and screws 841a, 841b do not secure the control circuit board 832 to the HDA 831. The external connector 84 is held securely in the exterior housing 82 via pipes 842a, 842b, which are shafts, and rubber bushings 843a, 843b in addition to screws.

Figure 9:
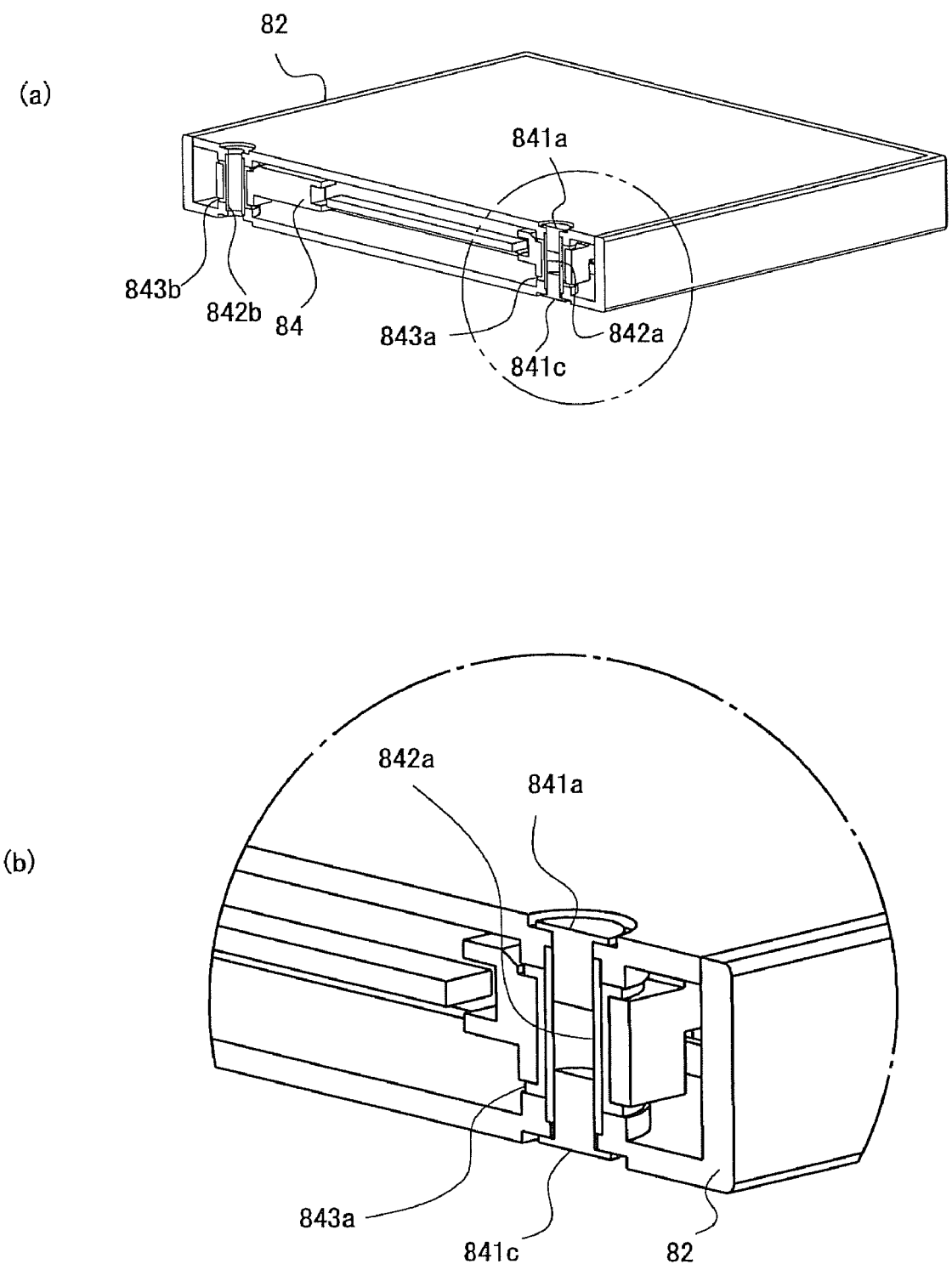
FIG. 9 are cross-sectional views illustrating screws securing an external connector to an exterior housing and their corresponding receiving parts, in accordance with an embodiment of the present invention.

With reference now to FIGS. 9(a) and 9(b), in accordance with an embodiment of the present invention, cross-sectional views depicting a structure securing the external connector 84 to the exterior housing 82 are shown. FIG. 9(b) is an enlarged view of the portion of the figure that is circled in FIG. 9(a). In FIG. 9(a), a screw at one side for securing the external connector 84 to the exterior housing 82 is absent from the figure so as not to obscure the following discussion. In FIG. 9(b), the external connector 84 has a trough-hole 844 and the rubber bushing 843a is inserted in the trough-hole 844. The pipe 842a penetrates a hole of the rubber bushing 843a. The inner surface adjacent to hole of the pipe 842a is threaded and the screws 841a, 841c inserted from the both sides are fit into and secured to the pipe 842a. The shaft structure of the screws 41a, 41c described referring to FIG. 6(b) utilizes fewer parts than this structure. The screw 841a secures the pipe 842a to the cover of the exterior housing 822 and the screw 841c secures the pipe 842a to the base of the exterior housing 821. The pipe 842a penetrates the hole of the external connector 844 in the top-bottom direction and the movement of the external connector 84 is defined by the pipe 842a and the exterior housing 82. The pipe 842a and the screws 841a, 841c contact the inner surface adjacent to a hole of the exterior housing; and the pipe 842a and the screws 841a, 841c do not move substantially relative to the exterior housing 82. Around the pipe 842a, parts of the rubber bushing 843a are present between the external connector 84 and the pipe 842a and between the external connector 84 and the base 821, and between the external connector 84 and the cover 822. The external connector 84 can move within the deformable range of the rubber bushing 843a. In this way, the allowed movement of the external connector 84 is smaller than the allowed movement of the main HDD 83 in this example, as well. Thus, the stroke of the main HDD 83, which is the deformation of the rubber mount 85, due to a mechanical shock can be increased and an amount of displacement of the external connector 84 relative to the exterior housing 82 can be limited within a defined range.

In an embodiment of the present invention, a rubber mount may be formed of material other than resin. Although a resin mount may be used for reducing a mechanical shock to a main HDD, a different elastic-shock-reduction part may be used. For example, a blade spring integrated with an exterior housing can reduce a mechanical shock to a main HDD. A structure different from screws may join and secure an external connector to an exterior housing or a main HDD. The structure of an exterior housing is not limited to the structures of the above examples. For example, an exterior housing may consist of parts separable in the left-right direction other than parts separable in the top-bottom direction.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A removable data-storage device comprising:
    a main data-storage unit;
    an exterior housing for containing the main data-storage unit;
    an elastic shock-reduction part between an inner wall of the exterior housing and the main data-storage unit for reducing a mechanical shock to the main data-storage unit by elasticity; and
    an external connector exposed from an opening of the exterior housing; wherein
    the main data-storage unit is placed at the rear of the external connector as viewed from the opening,
    the external connector is joined and secured to the main data-storage unit and the exterior housing,
    the elastic shock-reduction part is configured to deform with a movement of the main data-storage unit in the exterior housing produced by a mechanical shock and a movable range of the external connector is smaller than a movable range of the main data-storage unit;
    a shaft restricting a movement of the external connector, wherein
    the external connector is joined and secured to the exterior housing via the shaft,
    a resin bushing between an outer surface of the shaft and an inner surface of a hole of the external connector; wherein
        the external connector has a greater movable range in an insertion and extraction direction to an external device than the movable ranges in the other two directions vertical to the insertion and extraction direction,
        the external connector having a hole where the shaft penetrates and which is vertical to the insertion and extraction direction,
        a diameter of the hole in the insertion and extraction direction being larger than a diameter in a direction vertical to the insertion and extraction direction, and
        wherein the resin bushing comprises:
            a first flat-layer portion and
            a second layer portion in the direction of the larger diameter,
        the second layer portion having projections and depressions, and
        wherein the first flat-layer portion contacts the shaft and the inner surface of the hole in the direction of the smaller diameter.

2. The removable data-storage device according to claim 1, wherein
    the main data-storage unit comprises an assembly including a box shaped enclosure and a control circuit board on a outer surface of the enclosure; and
    the control circuit board and the external connector are secured to the enclosure with a same fastener.

3. The removable data-storage device according to claim 1, wherein
    the elastic shock-reduction part comprises a part selected from the group consisting of a single elastic resin member and a plurality of separated elastic resin members and wherein the elastic shock-reduction part is placed between the main data-storage unit and an inner wall of the exterior housing to reduce a mechanical shock in a movement of the main data-storage unit in any direction.

4. The removable data-storage device according to claim 1, wherein
    the elastic shock-reduction part comprises a part selected from the group consisting of a single elastic resin member and a plurality of separated elastic resin members and wherein the elastic shock-reduction part comprises a plurality of projections contacting the main data-storage unit or an inner wall of the exterior housing.

5. The removable data-storage device according to claim 1, wherein
    the main data-storage unit is joined to only the external connector.

6. The removable data-storage device according to claim 1, wherein
    the shaft comprises two screw shafts secured together so as to sandwich the external connector and the exterior housing.

7. The removable data-storage device according to claim 1, wherein
    the external connector has a greater movable range in an insertion and extraction direction to an external device than the movable ranges in the other two directions vertical to the insertion and extraction direction.

* * * * *